(12) United States Patent
Kikuchi

(10) Patent No.: US 12,219,217 B2
(45) Date of Patent: Feb. 4, 2025

(54) VIDEO DISTRIBUTION IN WHICH CHAPTER IS SET BASED ON REACTION OF STREAMER DURING DISTRIBUTION

(71) Applicant: RAKUTEN MOBILE, INC., Tokyo (JP)

(72) Inventor: Ko Kikuchi, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/921,499

(22) PCT Filed: Jun. 28, 2022

(86) PCT No.: PCT/JP2022/025650
§ 371 (c)(1),
(2) Date: Oct. 26, 2022

(87) PCT Pub. No.: WO2024/004008
PCT Pub. Date: Jan. 4, 2024

(65) Prior Publication Data
US 2024/0357207 A1    Oct. 24, 2024

(51) Int. Cl.
*H04N 21/4788* (2011.01)
*H04N 21/2187* (2011.01)
(52) U.S. Cl.
CPC ..... *H04N 21/4788* (2013.01); *H04N 21/2187* (2013.01)
(58) Field of Classification Search
CPC ............ H04N 21/4788; H04N 21/2187
See application file for complete search history.

(56) References Cited

U.S. PATENT DOCUMENTS

| | | | | |
|---|---|---|---|---|
| 11,917,214 B1 * | 2/2024 | Bell-Geddes | ...... | H04N 21/2187 |
| 2014/0337126 A1 * | 11/2014 | Ohanyan | ............ | G06Q 30/0251 705/14.49 |
| 2023/0254528 A1 * | 8/2023 | Yokohata | ........... | H04N 21/4788 725/37 |

FOREIGN PATENT DOCUMENTS

JP        2022-024982 A    2/2022

* cited by examiner

*Primary Examiner* — Nnenna N Ekpo
(74) *Attorney, Agent, or Firm* — Sughrue Mion, PLLC

(57) ABSTRACT

A distribution controller (141) distributes a live video provided from a streamer to a plurality of terminals each of which has a comment area, the comment area allowing a predetermined number of comments to be displayed. A receiver (120) receives a comment posted from, among the plurality of terminals, a viewer terminal used by a viewer during distribution of the live video. A sender (110) sends a comment that the receiver (120) received to the plurality of terminals to cause the comment to be added to the comment areas in a last-in-first-out manner. An identifier (144) identifies, among respective comments currently being displayed in the comment area, a comment to which the streamer reacted. A setter (541) sets a chapter to divide the live video, based on a relative time in the live video corresponding to a time at which the identified comment is received.

6 Claims, 14 Drawing Sheets

| | | | | |
|---|---|---|---|---|
| 531a | 531b | 531c | | 531d |
| CHAPTER NUMBER | RELATIVE TIME | KEYWORD | ADDRESS | ... |
| 1 | 0:01:43 | DRIVING TIME | https://XXXX.com/AbCd1eFgH2IjK?t=103 | ... |
| : | : | : | : | ... |

| COMMENT ID 131a | RECEPTION TIME 131b | COMMENT 131c | DISPLAY FLAG 131d | REACTION FLAG 131e | |
|---|---|---|---|---|---|
| CM-123ABC | 20:21:52 | What a long battery life! | 1 (TO BE DISPLAYED) | 0 (NOT REACTED) | ... |
| CM-234BCD | 20:21:51 | That seems to be a rather long time. | 1 (TO BE DISPLAYED) | 0 (NOT REACTED) | ... |
| CM-345CDE | 20:21:43 | How long is the driving time? | 1 (TO BE DISPLAYED) | 1 (REACTED) | ... |
| CM-456DEF | 20:21:35 | I've been waiting for that function. | 1 (TO BE DISPLAYED) | 0 (NOT REACTED) | ... |
| CM-567EFG | 20:21:30 | I prefer the previous type. | 1 (TO BE DISPLAYED) | 0 (NOT REACTED) | ... |
| CM-678FGH | 20:21:22 | I see. | 0 (NOT DISPLAYED) | — | ... |
| CM-789GHI | 20:21:20 | Your explanation is excellent. | 0 (NOT DISPLAYED) | — | ... |
| CM-890HIJ | 20:21:13 | Good evening. | 0 (NOT DISPLAYED) | — | ... |
| ... | ... | ... | ... | ... | ... |

FIG. 5

| | | | |
|---|---|---|---|
| 20:21:30 | (C) | I prefer the previous type. | CA |
| 20:21:35 | (T) | I've been waiting for that function. | |
| 20:21:43 | (R) | How long is the driving time? | DC |
| 20:21:51 | (B) | That seems to be a rather long time. | |
| 20:21:52 | (S) | What a long battery life! | |

VIDEO DISTRIBUTION IN WHICH CHAPTER IS SET BASED ON REACTION OF STREAMER DURING DISTRIBUTION

TECHNICAL FIELD

The present disclosure relates to video distribution in which a chapter is set based on reaction of a streamer during distribution.

BACKGROUND ART

Recent years, distribution systems that distribute live videos provided by streamers to viewer terminals have been widely accepted. Such a distribution system is, for example, configured to allow a viewer who is viewing a live video to post a comment. There are some cases where a streamer, reacting to a posted comment, refers to (speaks about) the comment in a live video. Since this reference to a comment by the streamer generates a sense of togetherness, such as a viewer himself/herself participating in the live video, in viewers, more frequent use of the distribution system by viewers can be expected.

As an example of prior art of such a distribution system, a distribution system that appropriately processes a posted comment is disclosed in Patent Literature 1. In the distribution system, by limiting a comment to be displayed superimposed on a video according to attribute information of a poster of the comment, a video is displayed in an easily viewable manner even when a large number of comments are posted.

CITATION LIST

Patent Literature

Patent Literature 1: Unexamined Japanese Patent Application Publication No. 2022-24982

SUMMARY OF INVENTION

Technical Problem

In the distribution system disclosed in the above-described Patent Literature 1, reaction of a streamer to a posted comment has not been utilized at all.

The present disclosure has been made to solve the above-described problem, and an objective of the present disclosure is to provide video distribution in which a chapter is set based on reaction of a streamer during distribution.

Solution to Problem

A server device according to a first aspect of the present disclosure includes
one or more processors,
in which at least one of the one or more processors executes processing of:
distributing a live video provided from a streamer to a plurality of terminals each of which has a comment area, the comment area allowing a predetermined number of comments to be displayed;
receiving a comment posted from, among the plurality of terminals, a viewer terminal used by a viewer during distribution of the live video;
sending the received comment to the plurality of terminals to cause the comment to be added to the comment areas in a last-in-first-out manner;
identifying, among respective comments currently being displayed in the comment area, a comment to which the streamer reacted; and
setting a chapter to divide the live video, based on a relative time in the live video corresponding to a time at which the identified comment is received.

A setting method according to a second aspect of the present disclosure includes
a computer:
distributing a live video provided from a streamer to a plurality of terminals each of which has a comment area, the comment area allowing a predetermined number of comments to be displayed;
receiving a comment posted from, among the plurality of terminals, a viewer terminal used by a viewer during distribution of the live video;
sending the received comment to the plurality of terminals to cause the comment to be added to the comment areas in a last-in-first-out manner;
identifying, among respective comments currently being displayed in the comment area, a comment to which the streamer reacted; and
setting a chapter to divide the live video, based on a relative time in the live video corresponding to a time at which the identified comment is received.

A recording medium according to a third aspect of the present disclosure records a program causing a computer to execute processing of:
distributing a live video provided from a streamer to a plurality of terminals each of which has a comment area, the comment area allowing a predetermined number of comments to be displayed;
receiving a comment posted from, among the plurality of terminals, a viewer terminal used by a viewer during distribution of the live video;
sending the received comment to the plurality of terminals to cause the comment to be added to the comment areas in a last-in-first-out manner;
identifying, among respective comments currently being displayed in the comment area, a comment to which the streamer reacted; and
setting a chapter to divide the live video, based on a relative time in the live video corresponding to a time at which the identified comment is received.

Advantageous Effects of Invention

The present disclosure enables video distribution in which a chapter is set based on reaction of a streamer during distribution to be provided.

BRIEF DESCRIPTION OF DRAWINGS

FIG. 4 is a schematic diagram illustrating an example of comment management information;

FIG. 5 is a schematic diagram illustrating an example of control of display of a comment in a comment area;

DESCRIPTION OF EMBODIMENTS

Figure 1:
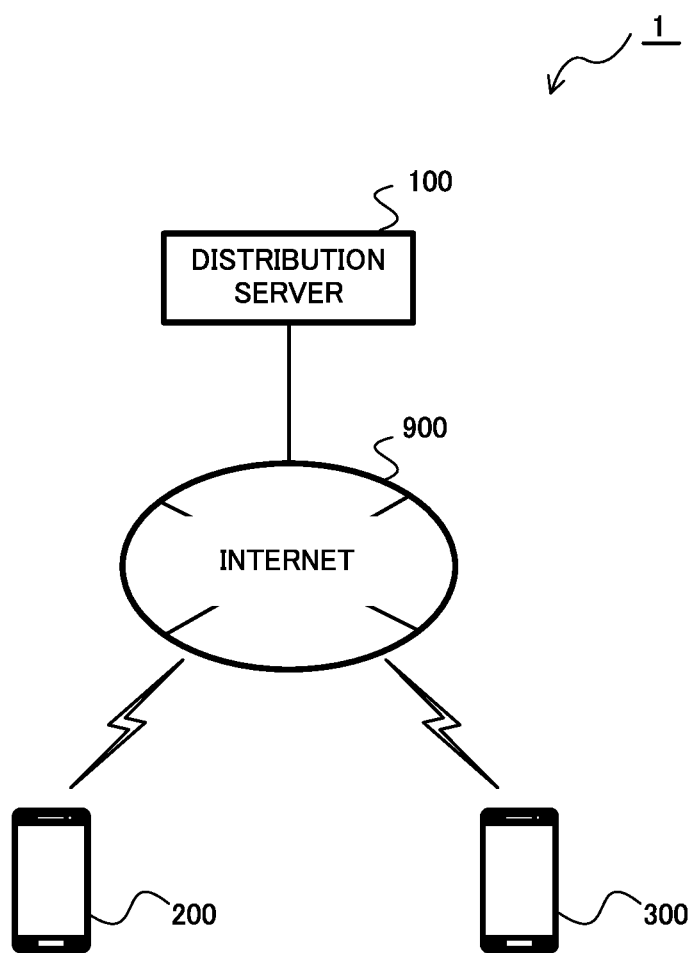
FIG. 1 is a schematic diagram illustrating an example of an overall configuration of a distribution system according to Embodiment 1 of the present disclosure.

Embodiments of the present disclosure are described below in detail with reference to the drawings. Note that, in the drawings, the same reference signs are assigned to the same or equivalent constituent elements. In addition, although, in the following description, a case where a distribution server (server device) identifies a comment (comment to which a streamer reacted) is described, the present disclosure can likewise be applied to even a case where a streamer terminal identifies a comment, as described later. That is, the embodiments to be described below are for explaining the present disclosure, not for limiting the scope of the present disclosure. Accordingly, it is possible for a person skilled in the art to employ embodiments in which part or all of the elements of the embodiments are replaced by equivalents thereof, which are also included in the scope of the present disclosure.

Embodiment 1

FIG. 1 is a schematic diagram illustrating an example of an overall configuration of a distribution system 1 according to Embodiment 1 of the present disclosure. In the distribution system 1, a distribution server 100 that distributes a live video, a streamer terminal 200 that is used by a streamer, and a viewer terminal 300 that is used by a viewer are connected to one another in a communicable manner via the Internet 900, as an example. Note that it is assumed that a large number of streamer terminals 200 and a large number of viewer terminals 300 exist according to the number of streamers and the number of viewers who uses the system, respectively.

The distribution server 100 is, for example, a server device (computer used as a server or the like) and distributes a live video provided by a streamer to a viewer terminal 300. The distribution server 100 also sends a comment posted during distribution of a live video to a streamer terminal 200 and a viewer terminal 300.

Each streamer terminal 200 is a terminal, such as a personal computer (PC), a smartphone, and a tablet, and is used by a streamer who performs live distribution. For example, the streamer captures a live video for introducing a product. By the streamer terminal 200 providing the distribution server 100 with the live video, the live video is distributed from the distribution server 100 to a viewer terminal 300. Note that the streamer is able to, during distribution of a live video, browse comments posted by viewers using viewer terminals 300 and, reacting to a predetermined comment, refer to the comment in the live video.

Each viewer terminal 300 is a terminal, such as a smartphone, a tablet, and a PC, and is used by a viewer who views a distributed live video. For example, the viewer starts a video viewing app (or a browser app) in the viewer terminal 300 and, after logging in to the distribution server 100 and the like, views a live video distributed from the distribution server 100. In addition, the viewer is able to post a comment addressed to the streamer of a live video that the viewer is viewing. Specifically, on a screen of the video viewing app or the like, a video area for displaying a live video and a comment area for displaying a comment are formed, as described later. Note that the comment area is configured such that latest comments can be displayed in a predetermined number. In other words, while the number of comments does not reach the predetermined number, every time a comment is posted, the comment is successively added to the comment area. After the number of comments has reached the predetermined number, when a comment is posted, an older comment is removed from the comment area in a last-in-first-out manner and the new comment is added to the comment area.

(Outline Configuration of Information Processing Device 400)

A typical information processing device 400 by which the distribution server 100, each of the streamer terminals 200, and each of the viewer terminals 300 according to Embodiment 1 are achieved is described.

Figure 2:
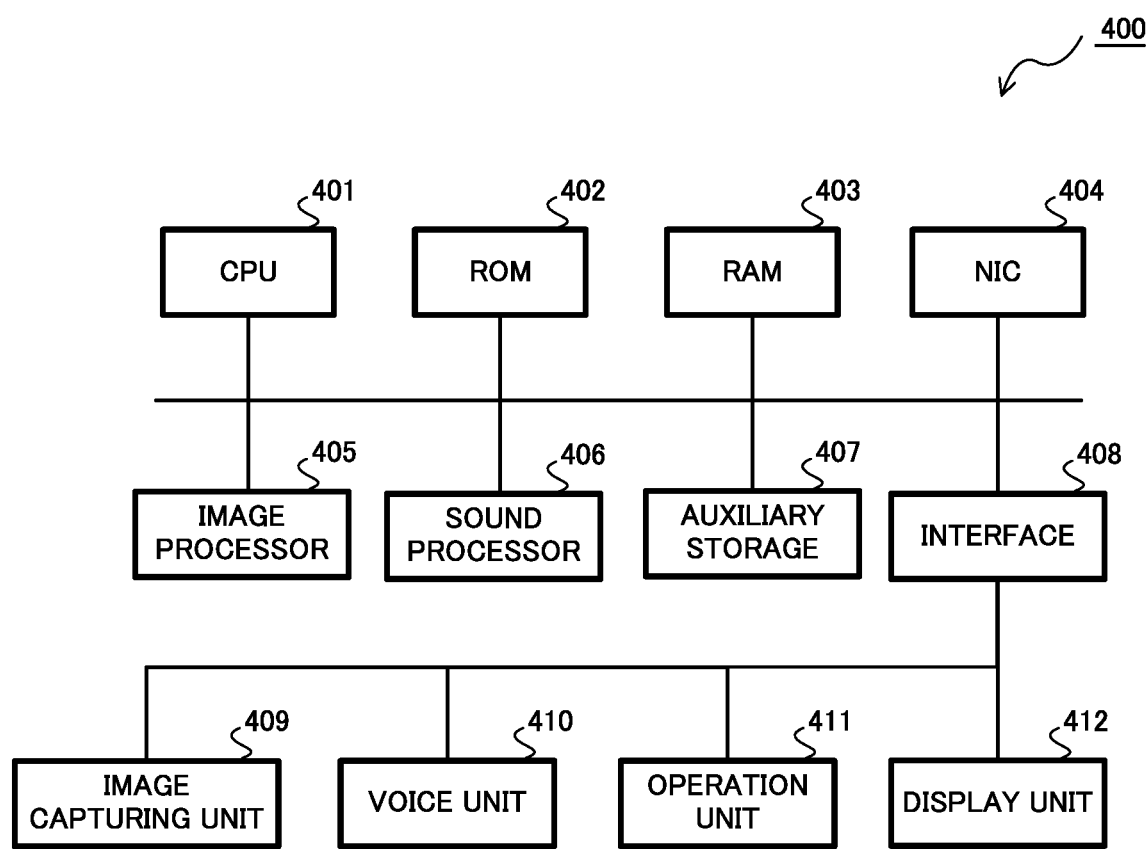
FIG. 2 is a block diagram illustrating an example of an outline configuration of a typical information processing device by which a distribution server and the like are achieved.

The information processing device 400 includes, as illustrated in FIG. 2, a central processing unit (CPU) 401, a read only memory (ROM) 402, a random access memory (RAM) 403, a network interface card (NIC) 404, an image processor 405, a sound processor 406, an auxiliary storage 407, an interface 408, an image capturing unit 409, a voice unit 410, an operation unit 411, and a display unit 412.

The CPU 401 controls operation of the entire information processing device 400, and is connected to the respective constituent elements and exchanges control signals and data with the constituent elements.

In the ROM 402, an initial program loader (IPL), which is executed immediately after power-on, is recorded, and, by the IPL being executed, programs stored in the auxiliary storage 407 are read into the RAM 403 and execution of the programs by the CPU 401 is started.

The RAM 403 is a memory device for temporarily recording data and programs, and, in the RAM 403, programs and data read from the auxiliary storage 407 and, in addition thereto, data required for communication and the like are stored.

The NIC 404 is a device for connecting the information processing device 400 to a computer communication network, such as the Internet, and includes a circuit conforming to the 10BASE-T/100BASE-T standard that is used when a local area network (LAN) is constructed, an analog modem for establishing a connection to the Internet using a telephone line, an integrated services digital network (ISDN) modem, an asymmetric digital subscriber line (ADSL) modem, a cable modem for establishing a connection to the Internet using a cable television line, or the like.

The image processor 405 processes image data read from the auxiliary storage 407 or the like, using an image calculation processor (not illustrated) that the CPU 401 or the image processor 405 includes and subsequently records the processed image data in a frame memory (not illustrated) that the image processor 405 includes. Image data recorded in the frame memory are converted to a video signal at a predetermined synchronization timing, and the video signal is output to the display unit 412 via the interface 408 and the like. In other words, under the control of the CPU 401, the image processor 405 generates an image required in advancing processing performed by the information processing device 400 and causes the display unit 412 to display the image.

The sound processor 406 converts music data and voice data read from the auxiliary storage 407 or the like to a sound signal and outputs the sound signal to the outside via the interface 408 and the like. Note that, when the information processing device 400 includes a speaker thereinside, the sound processor 406 outputs the converted sound signal to the speaker. In other words, under the control of the CPU 401, the sound processor 406 generates a music sound and a voice required to be generated in advancing processing performed by the information processing device 400 and causes the music sound and the like to be output from an internal or external speaker.

The auxiliary storage 407 is a hard disk, a solid state drive (SSD), or the like and stores various types of programs and a various types of data required for operation control of the entire information processing device 400. For example, in the auxiliary storage 407, programs for achieving the distribution server 100 and the like according to the embodiments are stored. Under the control of the CPU 401, the auxiliary storage 407 appropriately reads stored programs and data and causes the RAM 403 or the like to temporarily store the read programs and data.

The interface 408 conforms to a standard, such as HDMI (registered trademark), universal serial bus (USB), and inter-integrated circuit (I2C), and, to the interface 408, the image capturing unit 409, the voice unit 410, the operation unit 411, and the display unit 412 are connected. Note that the interface 408 may send and receive necessary information to and from a connected external device in addition to the units.

The image capturing unit 409 includes, for example, a single focus lens and an imaging element (a complementary metal oxide semiconductor (CMOS) or a charge coupled device (CCD)) of a predetermined number of pixels and captures a still image or a video.

The voice unit 410 is, for example, a microphone or the like and accepts as input a voice (speech) of a worker or the like who uses the information processing device 400.

The operation unit 411 accepts operation input from a worker or the like who uses the information processing device 400.

The display unit 412 draws an image corresponding to image data output by the image processor 405 and presents the image to a worker or the like who uses the information processing device 400.

In addition, the information processing device 400 may be configured to include, in place of the auxiliary storage 407, a drive unit of a digital versatile disc (DVD)-ROM or the like. In this case, the information processing device 400 reads programs and data from a DVD-ROM or the like mounted on the drive unit and operates in the same manner as described above.

Functions and the like of the distribution server 100, each of the streamer terminals 200, and each of the viewer terminals 300, which are achieved by the above-described information processing device 400, are described below with reference to FIGS. 3 to 8. When the information processing device 400 is powered on, programs that cause the information processing device 400 to function as the distribution server 100, the streamer terminal 200, or the viewer terminal 300 according to Embodiment 1 are executed, and the distribution server 100, the streamer terminal 200, or the viewer terminal 300 according to Embodiment 1 is achieved.

(Functional Configuration of Distribution Server 100)

Figure 3:
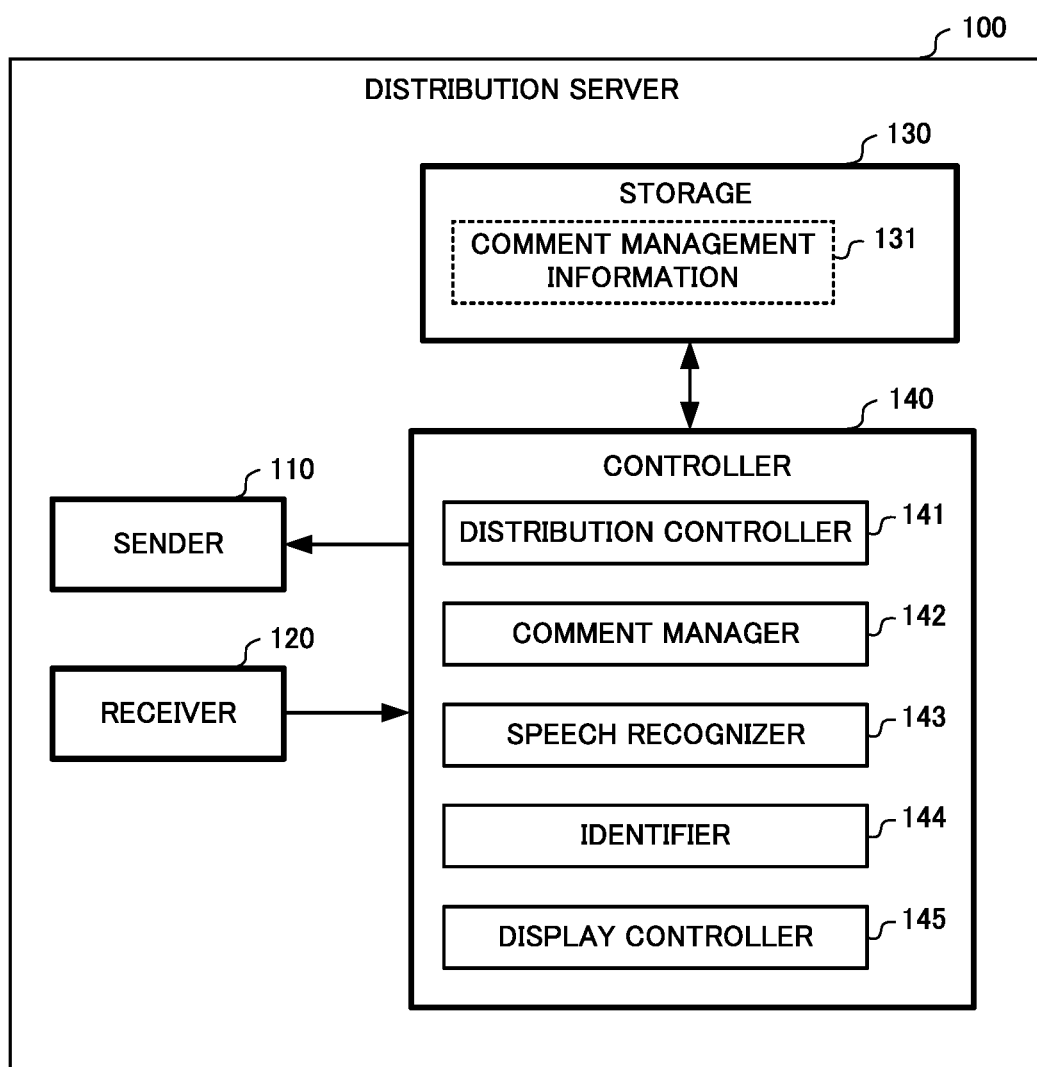
FIG. 3 is a block diagram illustrating an example of a functional configuration of the distribution server according to Embodiment 1.

FIG. 3 is a block diagram illustrating an example of a functional configuration of the distribution server 100 according to Embodiment 1. As illustrated, the distribution server 100 includes a sender 110, a receiver 120, a storage 130, and a controller 140.

The sender 110 sends various types of information addressed to a viewer terminal 300 and the like via the Internet 900. For example, the sender 110 distributes a live video provided by a streamer terminal 200 to a viewer terminal 300. The sender 110 also sends a comment posted from a viewer terminal 300 to a streamer terminal 200 and a viewer terminal 300. Further, the sender 110 sends command information to change a display form of a comment to a viewer terminal 300 and the like. Note that the afore-described NIC 404 can function as the sender 110 as described above.

The receiver 120 receives various types of information sent from a streamer terminal 200 and a viewer terminal 300 via the Internet 900. For example, the receiver 120 receives a live video provided by a streamer terminal 200. The receiver 120 also receives a comment posted from a viewer terminal 300. Note that the afore-described NIC 404 can function as the receiver 120 as described above.

The storage 130 stores various types of information required for processing in the distribution server 100. For example, the storage 130 stores comment management information 131.

The comment management information 131 is information to manage a comment posted by a viewer during distribution of a live video and includes, as an example, information as illustrated in FIG. 4. Specifically, in the comment management information 131, pieces of information, such as a comment ID 131a, a reception time 131b, a comment 131c, a display flag 131d, and a reaction flag 131e, are included. Note that the display flag 131d is a flag indicating whether or not the comment is currently displayed in a comment area for displaying a predetermined number of comments in a viewer terminal 300. Specifically, when the display flag 131d is "1", the display flag 131d indicates that the comment is a comment to be displayed, and, in contrast, when the display flag 131d is "0", the display flag 131d indicates that the comment is not a comment to be displayed. In addition, the reaction flag 131e is a flag indicating whether or not the streamer reacted to the comment. Specifically, when the reaction flag 131e is "1", the reaction flag 131e indicates that the streamer reacted to the comment, and, in contrast, when the reaction flag 131e is "0", the reaction flag 131e indicates that the streamer has not reacted (unreacted) to the comment.

The storage 130 stores, in addition to the comment management information 131, various types of information required for processing performed by the controller 140. For example, the storage 130 stores an ID, a password, and the like of a viewer who uses a viewer terminal 300. The storage 130 also stores, as information relating to a live video, a video management ID, a video title, a video summary, a distribution start time, and the like. Note that the afore-described auxiliary storage 407 or the like can function as the storage 130 as described above.

Returning to FIG. 3, the controller 140 controls the entire distribution server 100. The controller 140 includes, for example, a distribution controller 141, a comment manager 142, a speech recognizer 143, an identifier 144, and a display controller 145.

The distribution controller 141 distributes a live video received from a streamer terminal 200 to a viewer terminal 300. That is, when the receiver 120 receives a live video provided by a streamer terminal 200, the distribution controller 141 controls the sender 110 to distribute the received live video to a viewer terminal 300.

The comment manager 142 manages a comment posted by a viewer who is viewing a live video. That is, when the receiver 120 receives a comment posted from a viewer terminal 300, the comment manager 142 controls the sender 110 to send the received comment to a streamer terminal 200 and a viewer terminal 300. In addition, the comment manager 142 updates the comment management information 131, illustrated in the above-described FIG. 4. Specifically, the comment manager 142 adds a newly posted comment to the comment management information 131 (sets "1" and "0" in the display flag 131d and the reaction flag 131e of the comment, respectively) and also changes the display flag 131d of, among comments the display flags 131d of which are "1", a comment the reception time 131b of which is the oldest to "0". In addition, when the identifier 144, to be described later, identifies a comment, the comment manager 142 changes the reaction flag 131e of the comment to "1".

The speech recognizer 143 subjects speech spoken by a streamer in a live video to speech recognition in real time and converts the recognized speech to a speech text. For example, every time the streamer speaks, the speech recognizer 143 segments voice data into respective phoneme units, identifies each phoneme through comparison with feature distributions of sample phonemes, subjects the identified phonemes to pattern matching with words, and the like, and subsequently finally generates a speech text representing speech that the streamer spoke.

Every time a voice of the streamer is converted to a speech text by the speech recognizer 143, the identifier 144, by comparing the converted speech text with each comment that is currently displayed in the comment area of a viewer terminal 300, identifies a comment to which the streamer reacted (a comment to which the streamer referred in the live video). More specifically, the identifier 144 first subjects a speech text (natural sentence) to morphological analysis and extracts a keyword (for example, a noun or a noun phrase). Next, the identifier 144, referring to the comment management information 131 illustrated in FIG. 4, subjects each comment the display flag 131d of which is "1" to morphological analysis and extracts keywords of the respective comments. The identifier 144 compares the keyword extracted from the speech text (the keyword included in the speech text) with the keywords respectively extracted from the respective comments (the keywords respectively included in the respective comments) and identifies a comment including a keyword coinciding with the keyword in the speech text as a comment to which the streamer reacted.

More specifically, a case where the streamer speaks "Driving time of the battery was roughly four hours." is described. Note that it is assumed that, at a point of time of this speech, comments (comments 131c) the display flags 131d of which are "1" in the comment management information 131 are "Your explanation is excellent.", "I see.", "I prefer the previous type.", "I've been waiting for that function.", and "How long is the driving time?". In this case, the identifier 144 extracts keywords "battery", "driving time", and "four hours" from the speech text converted by the speech recognizer 143, and extracts keywords "explanation is excellent", "-(no keyword)", "previous type", "function", and "driving time" from the respective comments. The identifier 144 compares each keyword extracted from the speech text with the respective keywords extracted from the respective comments. Since, in this case, the keyword "driving time" in the speech text and the keyword "driving time" in one of the comments coincide with each other, the identifier 144 identifies the comment "How long is the driving time?", which includes the keyword "driving time", as a comment that the streamer reacted.

Note that the identifier 144 may text-search the respective comments the display flags 131d of which are "1" with each keyword extracted from the speech text as a key and identify a comment that is found in the search (in other words, a comment including the keyword) as a comment that the streamer reacted.

The display controller 145 controls display in a viewer terminal 300 with respect to a comment that the above-described identifier 144 identified. For example, the display controller 145, by sending command information to change a display form of the comment that the identifier 144 identified to a viewer terminal 300, differentiates the display form of the identified comment (in other words, a comment that the streamer reacted) in the comment area of the viewer terminal 300.

More specifically, a case where the above-described identifier 144 identifies the comment "How long is the driving time?" is described. In this case, the display controller 145, for example, sends command information to change the character color and the background color of the comment to a viewer terminal 300. In the viewer terminal 300 that has received the command information, for example, the display form of a comment DC ("How long is the driving time?") is changed in a comment area CA, as illustrated in FIG. 5. Note that change in a display form is not limited to change in the character color and the background color as described above, and, in addition thereto, may be change in a font, character size, or the like The above-described CPU 401 or the like can function as the controller 140 having a configuration as described above.

(Functional Configuration of Streamer Terminal 200)

Figure 6:
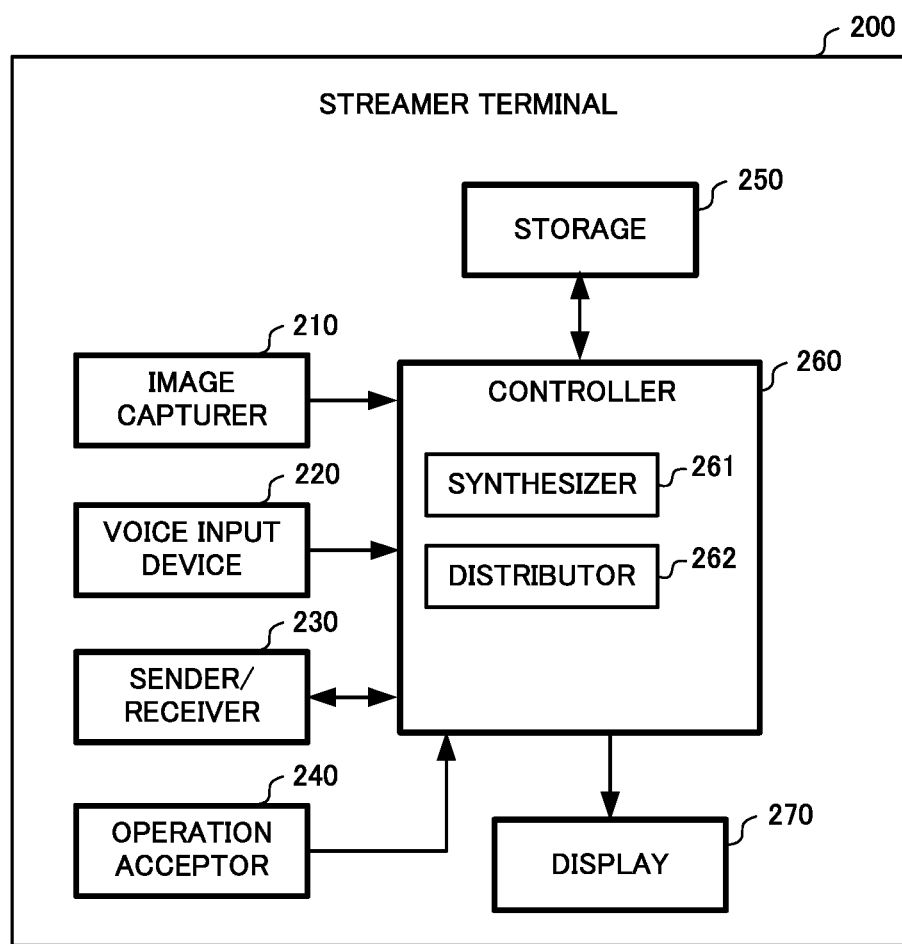
FIG. 6 is a block diagram illustrating an example of a functional configuration of a streamer terminal.

FIG. 6 is a block diagram illustrating an example of a functional configuration of each streamer terminal 200. As illustrated, the streamer terminal 200 includes an image capturer 210, a voice input device 220, a sender/receiver 230, an operation acceptor 240, a storage 250, a controller 260, and a display 270.

The image capturer 210 is, for example, a camera arranged in the streamer terminal 200 and captures a video of the streamer and the like during distribution. In other words, the image capturer 210 outputs an image including the streamer during distribution. Note that the afore-described image capturing unit 409 can function as the image capturer 210 as described above.

The voice input device 220 input a voice of the streamer. For example, the voice input device 220 inputs a voice that the streamer utters during distribution. Note that the afore-described voice unit 410 can function as the voice input device 220 as described above.

The sender/receiver 230 sends and receives various types of information to and from the distribution server 100 via the Internet 900. For example, the sender/receiver 230, controlled by the controller 260 (a distributor 262, to be described later), sends an image generated by synthesizing an object with an image captured by the image capturer 210 (more specifically, a video including voice input by the voice input device 220) to the distribution server 100 (distributes the image to a viewer terminal 300 via the distribution server 100). The sender/receiver 230 also receives a comment sent from the distribution server 100 (a comment posted from a viewer terminal 300). Note that the afore-described NIC 404 can function as the sender/receiver 230 as described above.

The operation acceptor 240 is a touch panel or a pointing device and accepts various types of operations from the streamer. For example, the operation acceptor 240 accepts an operation on an object to be synthesized with an image captured by the image capturer 210. Note that the afore-described operation unit 411 can function as the operation acceptor 240 as described above.

The storage 250 stores various types of information required for processing in the streamer terminal 200. For example, the storage 250 stores information on an object to be synthesized with a captured image, a synthesis position of the object, and the like. As an example, the object is subtitles (banner) including textual information to be notified to a viewer in a live video. In addition, the synthesis position is a position at which an object is synthesized within an image. Note that the afore-described auxiliary storage 407 or the like can function as the storage 250 as described above.

The controller 260 controls the entire streamer terminal 200. The controller 260 includes, for example, a synthesizer 261 and a distributor 262.

The synthesizer 261 synthesizes an object within an image captured by the image capturer 210. For example, the synthesizer 261 synthesizes textual information to be notified to a viewer within a captured image in accordance with information of the object and a synthesis position, which are stored in the storage 250.

The distributor 262 sends an image with which an object is synthesized by the synthesizer 261 to the distribution server 100 for distribution to a viewer terminal 300. That is, the distributor 262 controls the sender/receiver 230 to send an image with which an object is synthesized to the distribution server 100 and distributes the image to a viewer terminal 300 via the distribution server 100.

Note that the afore-described CPU 401 or the like can function as the controller 260 having a configuration as described above.

The display 270 displays an image with which an object is synthesized by the above-described synthesizer 261. In addition, the display 270, as with a display 350, to be described later, of a viewer terminal 300, has a comment area and displays a comment received by the sender/receiver 230. Note that the afore-described display unit 412 can function as the display 270 as described above.

(Functional Configuration of Viewer Terminal 300)

Figure 7:
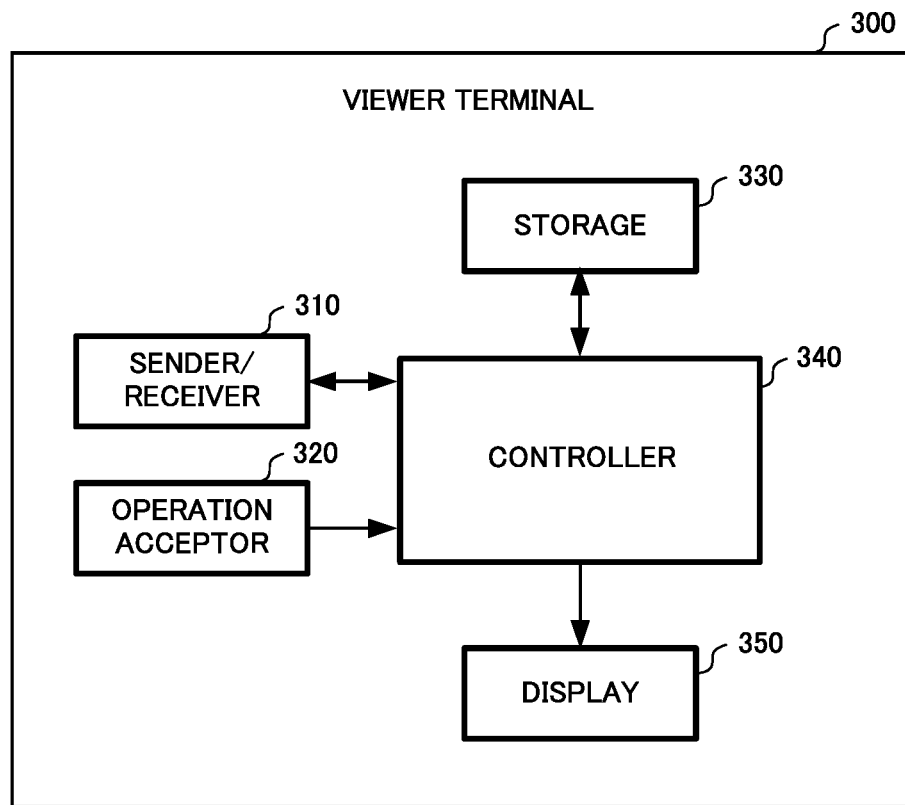
FIG. 7 is a block diagram illustrating an example of a functional configuration of a viewer terminal.

FIG. 7 is a block diagram illustrating an example of a functional configuration of each viewer terminal 300. As illustrated, the viewer terminal 300 includes a sender/receiver 310, an operation acceptor 320, a storage 330, a controller 340, and a display 350.

The sender/receiver 310 sends and receives various types of information to and from the distribution server 100 via the Internet 900. For example, the sender/receiver 310, controlled by the controller 340, receives a live video distributed from the distribution server 100. In addition, the sender/receiver 310 sends a comment accepted through the operation acceptor 320 to the distribution server 100 and receives a comment and command information (command information to change the display form of a comment) sent from the distribution server 100. Note that the afore-described NIC 404 can function as the sender/receiver 310 as described above.

The operation acceptor 320 is a touch panel or a pointing device and accepts various types of operations from the viewer. For example, the operation acceptor 320 accepts a comment input by the viewer. Note that the afore-described operation unit 411 can function as the operation acceptor 320 as described above.

The storage 330 stores various types of information required for processing in the viewer terminal 300. For example, the storage 330 stores various types of applications including a video viewing app and a browser app. More specifically, various types of applications are installed in the storage 330. Note that the video viewing app is, for example, an application to view a video distributed from the distribution server 100. In addition, a video distributed from the distribution server 100 may also be able to be viewed through the browser app. Note that the afore-described auxiliary storage 407 or the like can function as the storage 330 as described above.

The controller 340 controls the entire viewer terminal 300. For example, the controller 340 executes a video viewing app stored in the storage 330 and displays a live video or the like distributed from the distribution server 100 on the display 350. Since, as described later, a video area for displaying a live video and a comment area for displaying a comment are defined on the display 350, the controller 340 displays a live video that the sender/receiver 310 receives in the video area and displays a comment that the sender/receiver 310 receives in the comment area. The comment area is configured such that latest comments can be displayed in a predetermined number. Hence, while the number of comments does not reach the predetermined number, every time the sender/receiver 310 receives a comment, the controller 340 successively adds the received comment to the comment area. After the number of comments has reached the predetermined number, every time the sender/receiver 310 receives a comment, the controller 340 deletes an older comment from the comment area in a last-in-first-out manner and adds the new comment to the comment area. In addition, when the sender/receiver 310 receives command information, the controller 340 changes the display form of a comment targeted by the command information in the comment area in accordance with the command information. Note that the afore-described CPU 401 or the like can function as the controller 340 having a configuration as described above.

Figure 8:
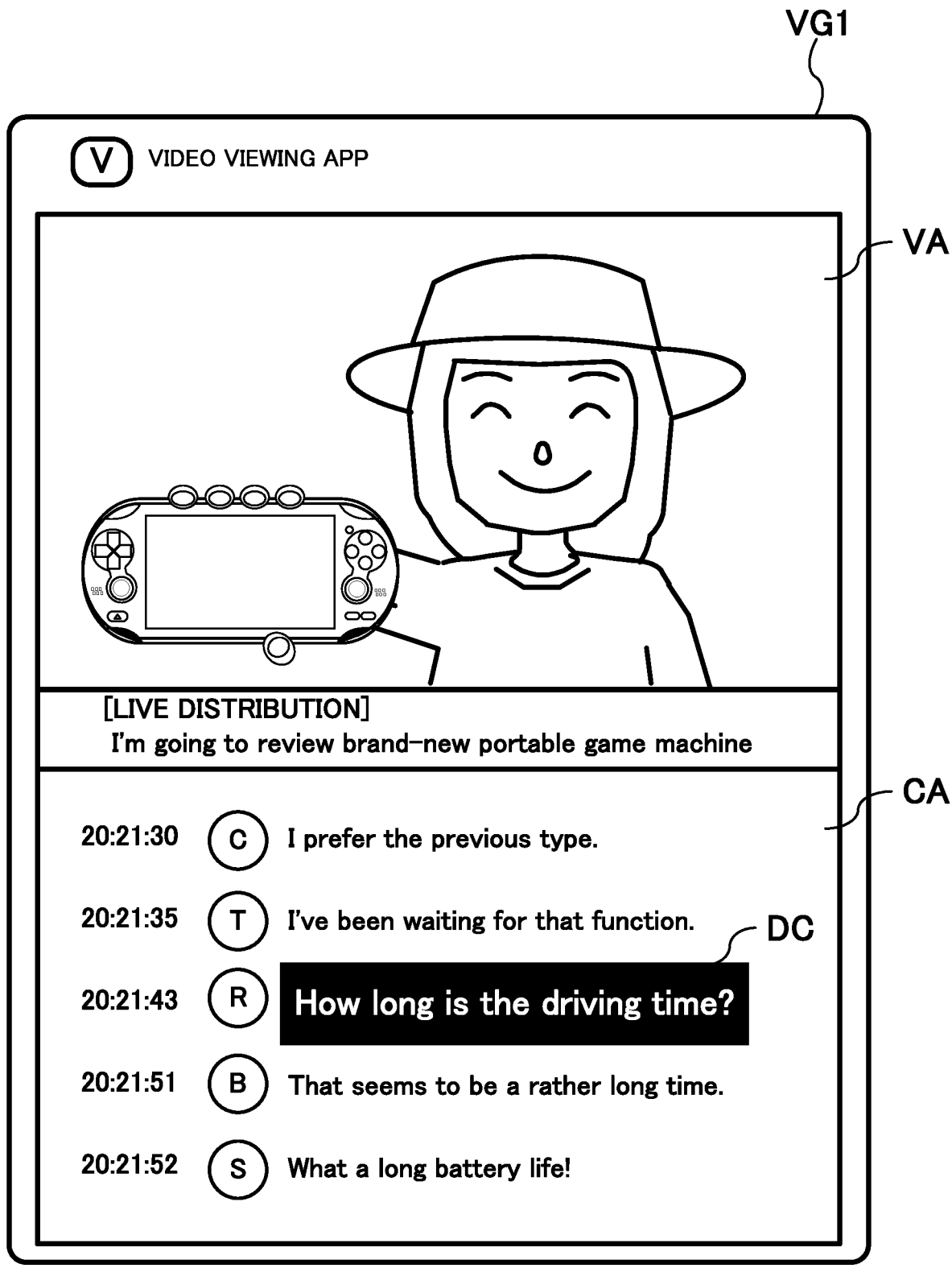
FIG. 8 is a schematic diagram illustrating an example of a viewing screen according to Embodiment 1.

The display 350 displays a screen matching an application that the above-described controller 340 executes. For example, when the video viewing app is executed by the controller 340, the display 350 displays a viewing screen VG1 as illustrated in FIG. 8. In the viewing screen VG1, a video area VA for displaying a live video and a comment area CA for displaying a predetermined number of posted comments are included. Note that, in the comment area CA, a comment DC to which the streamer reacted is displayed in a display form different from those of the other comments.

(Operation of Distribution Server 100)

Figure 9:
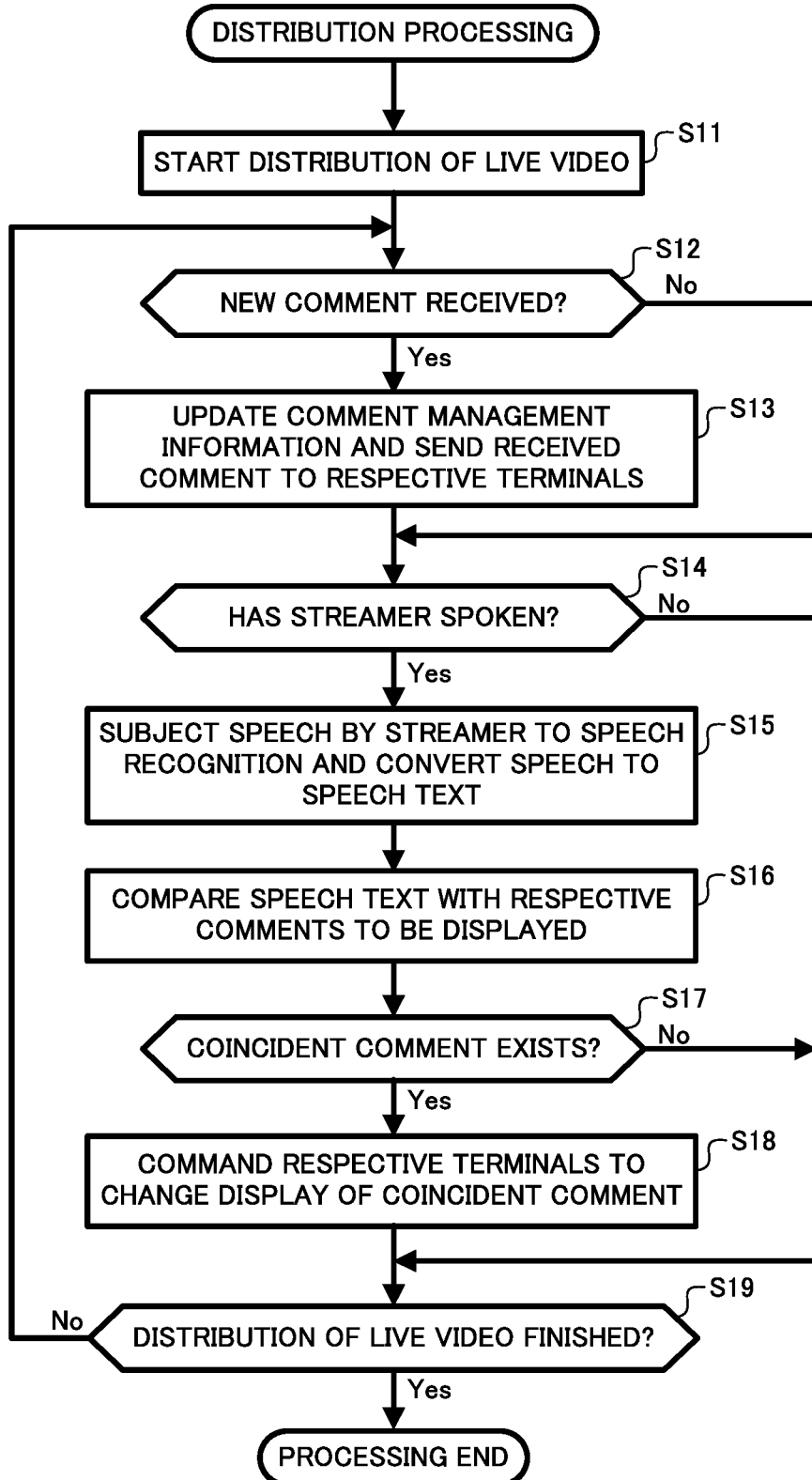
FIG. 9 is a flowchart for a description of distribution processing according to Embodiment 1.

Operation of the distribution server 100 is described below with reference to FIG. 9. FIG. 9 is a flowchart for a description of distribution processing according to Embodiment 1. The distribution processing is executed by the distribution server 100 when, for example, provision of a live video from a streamer terminal 200 is started.

First, the distribution server 100 starts distribution of a live video (step S11). That is, when the receiver 120 receives a live video provided by a streamer terminal 200, the controller 140 (distribution controller 141) controls the sender 110 to distribute the received live video to a viewer terminal 300.

The distribution server 100 determines whether or not the distribution server 100 has received a new comment (step S12). That is, the controller 140 (comment manager 142) determines whether or not the receiver 120 has received a comment posted from a viewer terminal 300.

When the distribution server 100 determines that the distribution server 100 has not received a new comment (step S12; No), the distribution server 100 advances the process to step S14, to be described later.

In contrast, when the distribution server 100 determines that the distribution server 100 has received a new comment (step S12; Yes), the distribution server 100 updates comment management information and sends the received comment to respective terminals (step S13). That is, the controller 140 (comment manager 142) updates the comment management information 131, illustrated in the above-described FIG. 4. Specifically, the comment manager 142 adds the new comment to the comment management information 131 (sets "1" and "0" in the display flag 131d and the reaction flag 131e of the comment, respectively) and also changes the display flag 131d of, among comments the display flags 131d of which are "1", a comment the reception time 131b of which is the oldest to "0". The controller 140 sends the new comment to the streamer terminal 200 and each viewer terminal 300.

The distribution server 100 determines whether or not the streamer has spoken (step S14). That is, the controller 140 (speech recognizer 143) determines whether or not the streamer has spoken in the live video.

When the distribution server 100 determines that the streamer has not spoken (step S14; No), the distribution server 100 advances the process to step S19, to be described later.

In contrast, when the distribution server 100 determines that the streamer has spoken (step S14; Yes), the distribution server 100 subjects speech of the streamer to speech recognition and converts the speech to a speech text (step S15). That is, the controller 140 (speech recognizer 143), for example, segments voice data that the streamer has spoken into respective phoneme units, identifies respective phonemes through comparison with feature distributions of sample phonemes, subjects the identified phonemes to pattern matching with words, and the like, and subsequently finally generates a speech text representing speech that the streamer spoke.

The distribution server 100 compares the speech text with respective comments to be displayed (step S16). That is, the controller 140 (identifier 144) compares the speech text converted in the above-described step S15 with respective comments that are currently displayed in the comment area of a viewer terminal 300. More specifically, the controller 140 first subjects the speech text to morphological analysis and extracts a keyword (for example, a noun or a noun phrase). Next, the controller 140, referring to the comment management information 131 illustrated in FIG. 4, subjects each comment the display flag 131d of which is "1" to morphological analysis and extracts keywords of the respective comments. The controller 140 compares the keyword extracted from the speech text with the respective keywords extracted from the respective comments.

The distribution server 100 determines whether or not there is a coincident comment (step S17). For example, the controller 140 (identifier 144) determines whether or not there is a comment that includes a keyword coinciding with the keyword included in the speech text through the comparison in the above-described step S16.

When the distribution server 100 determines that there is no coincident comment (step S17; No), the distribution server 100 advances the process to step S19, to be described later.

In contrast, when the distribution server 100 determines that there is a coincident comment (step S17; Yes), the distribution server 100 commands each terminal to change the display form of the coincident comment (step S18). That is, the controller 140 (display controller 145), by sending command information to change the display form of the coincident comment to each viewer terminal 300 and the like, differentiates the display form of the comment to which the streamer reacted in the comment area of each viewer terminal 300. For example, a viewer terminal 300 that has received the command information changes the display form of the comment DC ("How long is the driving time?") and displays the comment DC in the comment area CA in the viewing screen VG1 illustrated in the above-described FIG. 8.

The distribution server 100 determines whether or not the distribution of the live video is finished (step S19). That is, the controller 140 (distribution controller 141) determines whether or not the live video provided by the streamer terminal 200 is finished.

When the distribution server 100 determines that the distribution of the live video has not been finished (step S19; No), the distribution server 100 returns the process to the above-described step S12.

In contrast, when the distribution server 100 determines that the distribution of the live video is finished (step S19; Yes), the distribution server 100 terminates the distribution processing.

The distribution processing as described above enables, among comments posted by viewers, a comment to which the streamer reacted to be displayed in a distinguishable manner. Furthermore, since, when a comment to which the streamer reacted is identified, only comments that are displayed in the comment area are to be compared with the speech text, it is possible to not only increase the precision of matching of a comment with the speech text but also perform processing of matching at high speed. As a result, it is possible to determine whether or not the streamer reacted to a posted comment with high precision and a low calculation load.

Although, in the above-described Embodiment 1, a case where the display form of a comment to which the streamer reacted is changed was described, the display of a comment may be controlled from other viewpoints. For example, the display controller 145 may cause a comment that the identifier 144 identified (comment to which the streamer reacted) to be displayed in the comment area for a longer period of time than a standard period.

When described in more detail, the display controller 145, by sending command information to defer (renew) the reception time of the comment that the identifier 144 identified from the original reception time by a certain amount of time to the viewer terminal 300, causes the identified comment to be displayed for a longer period of time in the comment area of a viewer terminal 300. The display controller 145 may also, by including, in the command information, first command information to change the display form of a comment and second command information to defer the reception time of the comment from the original reception time by a certain amount of time, cause the comment the display form of which is changed to be displayed in the comment area for a longer period of time than a standard period. In such cases, it is possible to preferentially display a comment to which the streamer reacted.

Embodiment 2

Although, in the above-described Embodiment 1, a case where, when a comment to which the streamer reacted is identified, the display form of the comment is changed was described, a comment to which a streamer reacted may be used for setting a chapter. A distribution system characterized by using a comment to which a streamer reacted for setting a chapter is described below.

Figure 10:
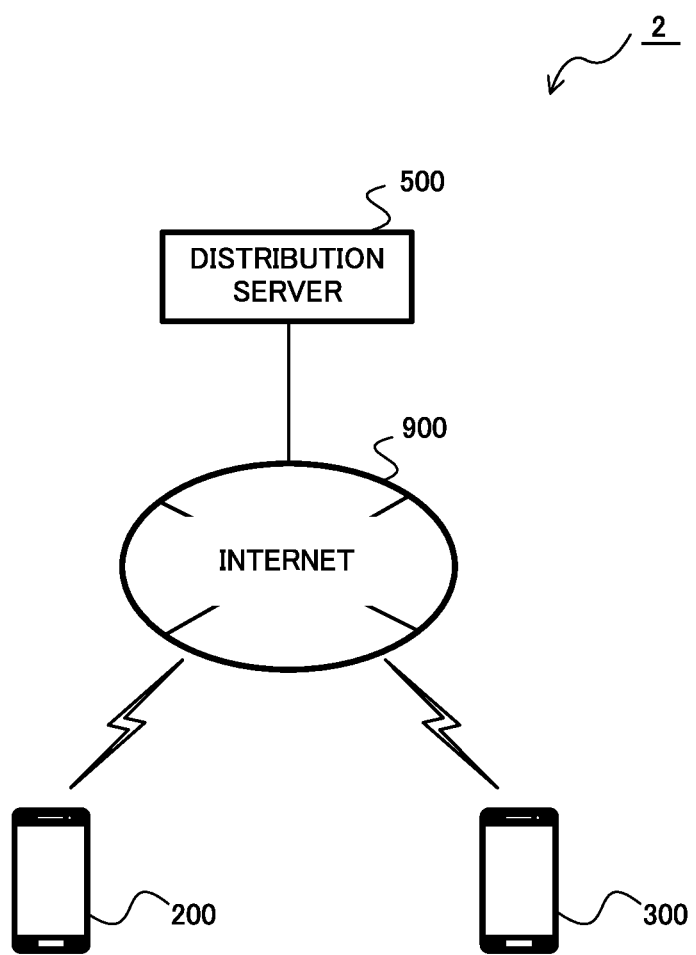
FIG. 10 is a schematic diagram illustrating an example of an overall configuration of a distribution system according to Embodiment 2 of the present disclosure.

FIG. 10 is a schematic diagram illustrating an example of an overall configuration of a distribution system 2 according to Embodiment 2 of the present disclosure. In the distribution system 2, a distribution server 500 that distributes a live video, a streamer terminal 200 that is used by a streamer, and a viewer terminal 300 that is used by a viewer are connected to one another in a communicable manner via the Internet 900, as an example. Note that the streamer terminal 200 and the viewer terminal 300 are respectively the same constituent elements as those in the distribution system 1 according to the above-described Embodiment 1. In other words, only the distribution server 500 differs from that in the distribution system 1 in FIG. 1.

The distribution server 500 is also achieved by an information processing device 400 in the above-described FIG. 2. That is, when the information processing device 400 is powered on, a program that cause the information processing device 400 to function as the distribution server 500 according to Embodiment 2 is executed, and the distribution server 500 according to Embodiment 2 is thereby achieved.

(Functional Configuration of Distribution Server 500)

Figure 11:
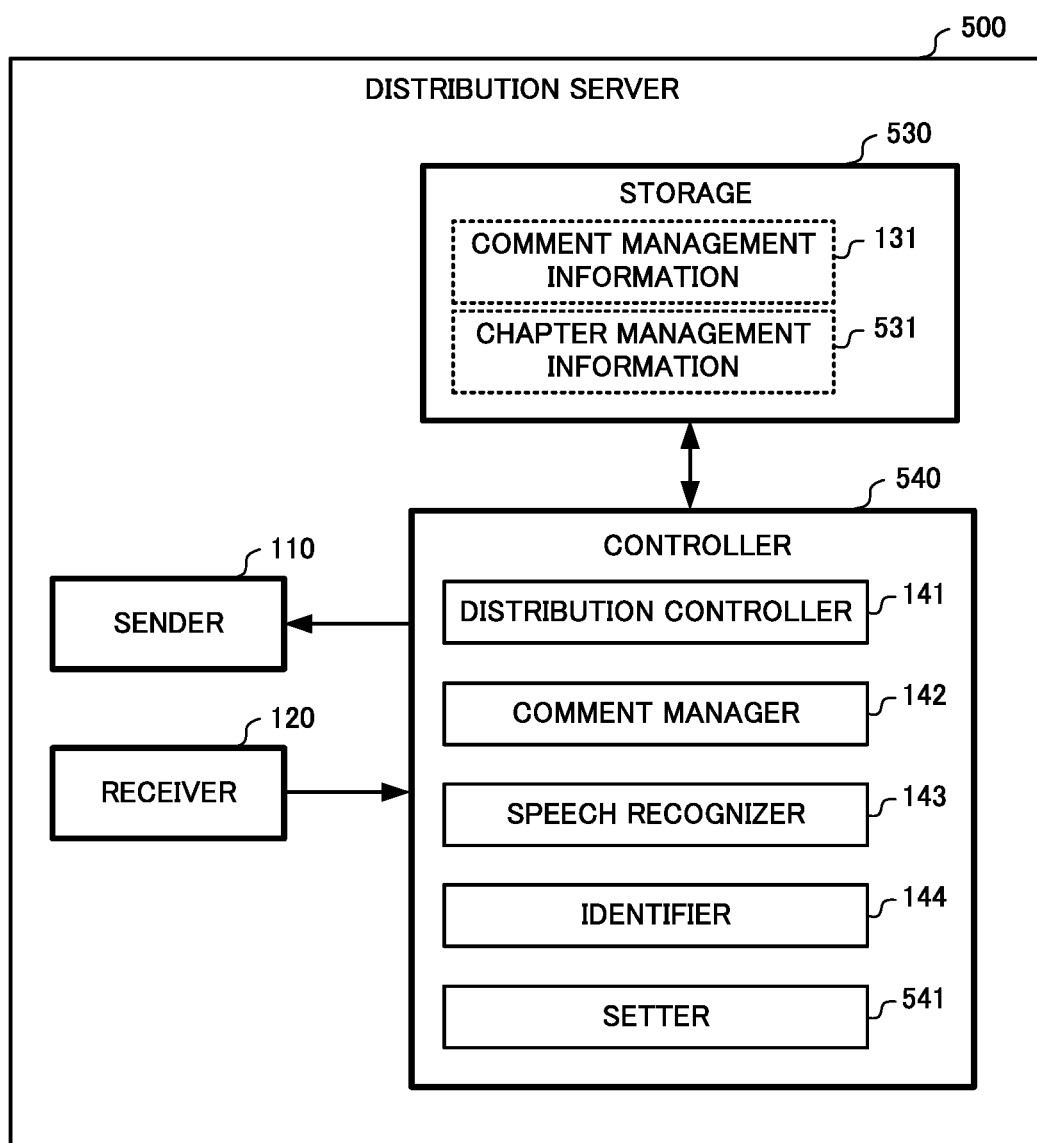
FIG. 11 is a block diagram illustrating an example of a functional configuration of a distribution server according to Embodiment 2.

FIG. 11 is a block diagram illustrating an example of a functional configuration of the distribution server 500 according to Embodiment 2. As illustrated, the distribution server 500 includes a sender 110, a receiver 120, a storage 530, and a controller 540. Note that the sender 110 and the receiver 120 have the same configurations as the sender 110 and the receiver 120 in the distribution server 100 in the above-described FIG. 3, respectively.

The storage 530 stores various types of information required for processing in the distribution server 500. For example, the storage 530 stores comment management information 131 and chapter management information 531. Note that the comment management information 131 is the same information as the comment management information 131 in the above-described FIG. 4. The storage 530 also saves (records) a live video in parallel with distribution of the live video. In other words, the controller 540 (distribution controller 141), while distributing a live video, saves the live video in the storage 530. Because of this configuration, as described later, when a viewer who has belatedly started viewing a live video initiates so-called chasing playback in order to view the video from a scene that the viewer missed, the controller 540 is capable of, even during distribution of the live video, performing distribution using a part of the live video that has been saved in the storage 530. In addition, when, after distribution of a live video was finished, a viewer initiates on-demand playback of the live video (past video), the controller 540 is capable of performing distribution using the live video saved in the storage 530.

Figure 12:
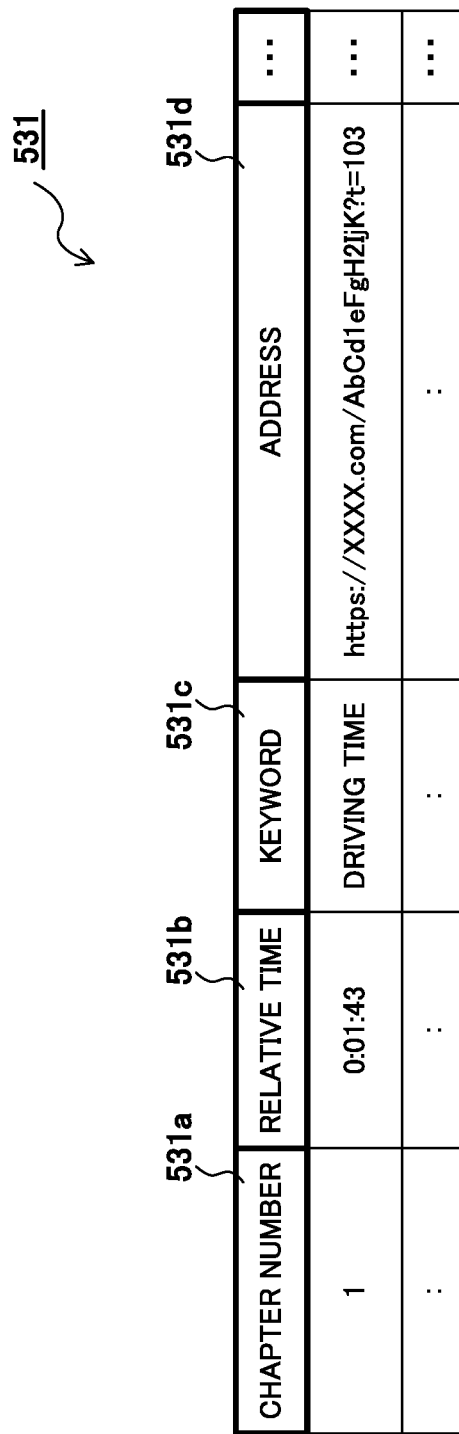
FIG. 12 is a schematic diagram illustrating an example of chapter management information.

The chapter management information 531 is information to manage chapters into which a live video is divided and includes, as an example, information as illustrated in FIG. 12. Specifically, in the chapter management information 531, pieces of information, such as a chapter number 531a, a relative time 531b, a keyword 531c, and an address 531d, are included. Note that the relative time 531b is time information indicating a start position of a chapter in a live video and is indicated by a relative time based on the start time point of the live video (elapsed time from the beginning of the video). The keyword 531c is a phrase to identify a chapter and is also a phrase that is referred to by a streamer in the chapter. The address 531d is a uniform resource locator (URL) to view a live video by specifying the start position of a chapter. Note that "?t=103" appended to the end of the URL is an example of an argument and defines that viewing is to be started from a position to which the video has advanced from the beginning of the live video when 103 seconds (a value indicated in seconds to which the value of the relative time 531b is converted) have elapsed.

The storage 530 stores, in addition to the chapter management information 531, various types of information required for processing performed by the controller 540. For example, the storage 530 stores an ID, a password, and the like of a viewer who uses a viewer terminal 300. The storage 530 also stores information relating to a live video. Note that the afore-described auxiliary storage 407 or the like can function as the storage 530 as described above.

Returning to FIG. 11, the controller 540 controls the entire distribution server 500. The controller 540 includes, for example, a distribution controller 141, a comment manager 142, a speech recognizer 143, an identifier 144, and a setter 541. Note that the comment manager 142, the speech recognizer 143, and the identifier 144 have the same configurations as the comment manager 142, the speech recognizer 143, and the identifier 144 in the distribution server 100 (controller 140) in the above-described FIG. 3, respectively. In addition, the distribution controller 141 further has, in addition to the functions of the distribution controller 141 of the above-described distribution server 100, the following functions.

The distribution controller 141, while distributing a live video to a viewer terminal 300, saves the live video in the storage 530. In addition, when, after the setter 541, to be described below, has set a chapter in a live video, a viewer initiates chasing playback or on-demand playback of the live video, the distribution controller 141 displays the chapter in a seek bar, which indicates a playback position of the live video. Because of this configuration, by, in addition to performing operation on chapter information (chapter information CD displayed in a summary area SA), to be described later, moving the seek bar to a chapter, the viewer can view the live video from the start position of the chapter.

The setter 541 sets a chapter to divide a live video, based on a relative time in the live video (in other words, a relative time based on the start time of the live video) corresponding to a time at which a comment that the identifier 144 identifies is received. For example, the setter 541 sets a chapter by generating the chapter management information 531 as illustrated in the above-described FIG. 12 and adding the generated chapter management information 531 to summary information of the live video.

More specifically, a case where the identifier 144 has extracted a keyword, such as "driving time", from a speech text and has identified a comment "How long is the driving time?" from comments that are currently displayed in a comment area is described as an example. Note that it is assumed that the start time of the live video is "20:20:00" and the address of the live video is "https://XXXX.com/AbCdleFgH2IjK". In this case, the setter 541 first calculates a relative time in the live video by subtracting the start time of the live video from a reception time 131*b* of the corresponding comment (the comment "How long is the driving time?" in the column of a comment 131*c*) in the comment management information 131 illustrated in FIG. 4. Specifically, when the setter 541 obtains "0:01:43" by subtracting "20:20:00" from "20:21:43", the setter 541 sets "0:01:43" in the relative time 531*b* in the chapter management information 531 illustrated in FIG. 12. Next, the setter 541 sets a keyword that the identifier 144 used at the time of identifying the comment (in other words, the keyword "driving time") in the keyword 531*c* in the chapter management information 531. Finally, the setter 541 appends the argument "?t=103" (viewing is started from a position to which the video has advanced from the beginning of the video when 103 seconds has elapsed) to the address of the live video and sets the resultant address in the address 531*d* in the chapter management information 531.

Figure 13:
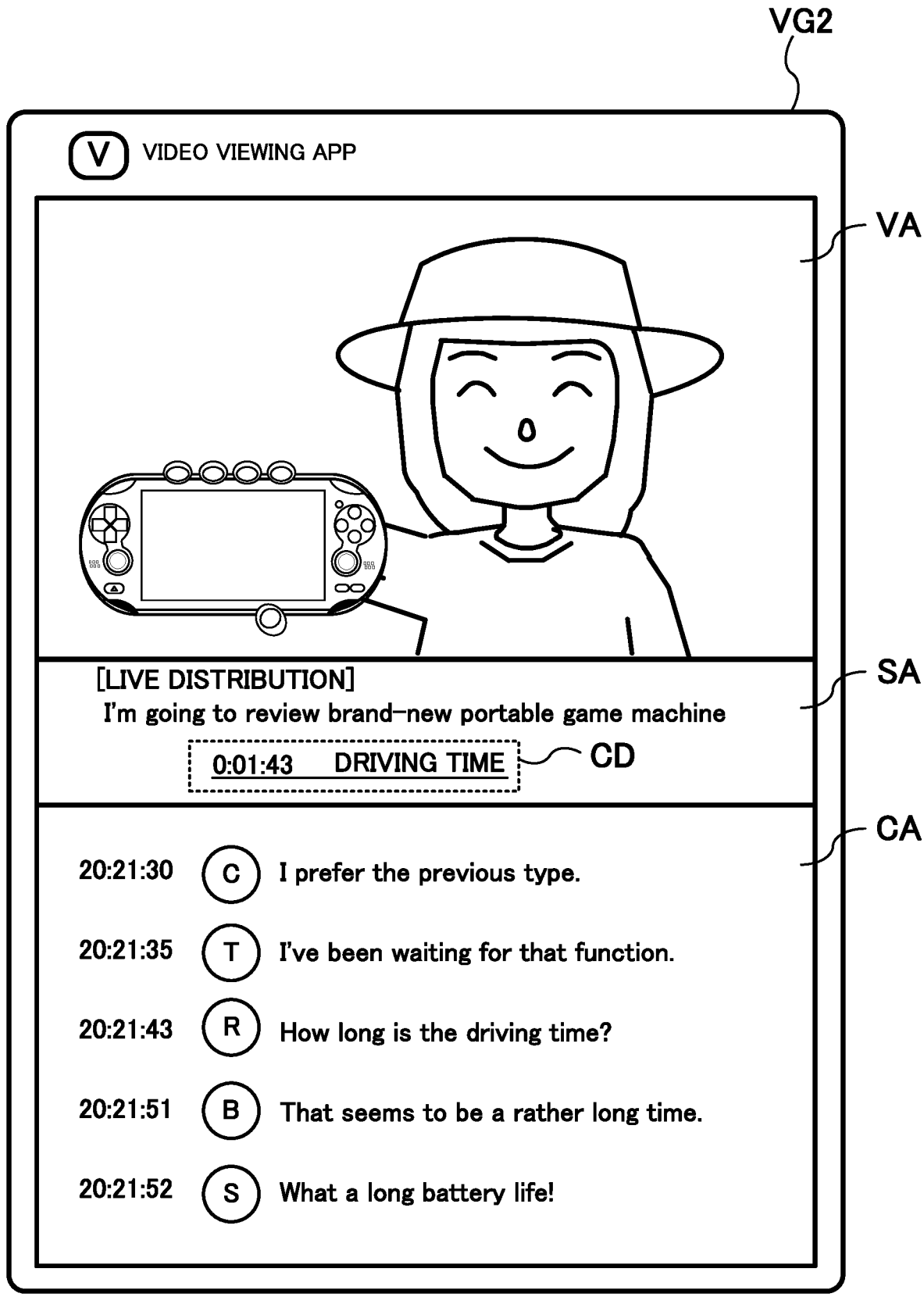
FIG. 13 is a schematic diagram illustrating an example of a viewing screen according to Embodiment 2.

The setter 541 sets the chapter by adding the chapter management information 531 generated in this way to the summary information on the live video. For example, when, after the chapter management information 531 as illustrated in FIG. 12 is added to the summary information on the live video, the live video is viewed by a viewer terminal 300, a display 350 of the viewer terminal 300 displays a viewing screen VG2 as illustrated in FIG. 13. In the viewing screen VG2, a video area VA for displaying a live video, the summary area SA for displaying a summary of the live video, and a comment area CA for displaying a predetermined number of posted comments are included. Note that, to the summary area SA, chapter information CD is added. The chapter information CD is linked to the address 531*d* in the chapter management information 531, and a viewer can, by performing touch operation on the chapter information CD, view the live video from the start position of the chapter.

(Operation of Distribution Server 500)

Figure 14:
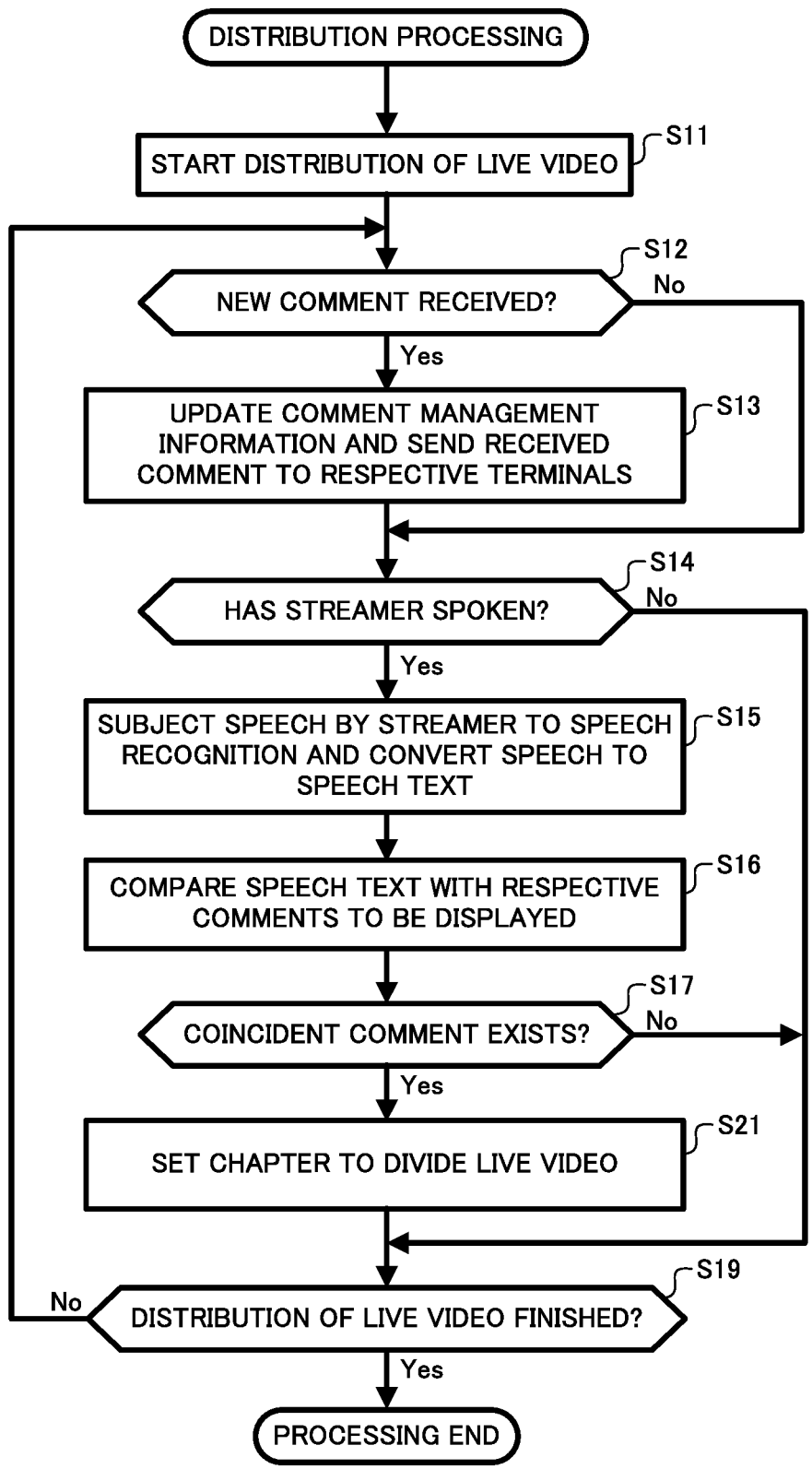
FIG. 14 is a flowchart for a description of distribution processing according to Embodiment 2.

Operation of the distribution server 500 is described below with reference to FIG. 14. FIG. 14 is a flowchart for a description of distribution processing according to Embodiment 2. The distribution processing is executed by the distribution server 500 when, for example, provision of a live video from a streamer terminal 200 is started. Note that, in steps S11 to S17 and S19 in the distribution processing in FIG. 14, the same processing as the processing in steps S11 to S17 and S19 in the distribution processing in the afore-described FIG. 9 is performed, respectively. Therefore, the same processing is simply described.

First, the distribution server 500 starts distribution of a live video (step S11) and determines whether or not the distribution server 500 has received a new comment (step S12).

When the distribution server 500 determines that the distribution server 500 has not received a new comment (step S12; No), the distribution server 500 advances the process to step S14, to be described later. In contrast, when the distribution server 500 determines that the distribution server 500 has received a new comment (step S12; Yes), the distribution server 500 updates comment management information and sends the received comment to respective terminals (step S13).

The distribution server 500 determines whether or not the streamer has spoken (step S14).

When the distribution server 500 determines that the streamer has not spoken (step S14; No), the distribution server 500 advances the process to step S19, to be described later. In contrast, when the distribution server 500 determines that the streamer has spoken (step S14; Yes), the distribution server 500 subjects speech of the streamer to speech recognition and converts the speech to a speech text (step S15).

The distribution server 500 compares the speech text with respective comments to be displayed (step S16) and determines whether or not there is a coincident comment (step S17).

When the distribution server 500 determines that there is no coincident comment (step S17; No), the distribution server 500 advances the process to step S19, to be described later.

In contrast, when the distribution server 500 determines that there is a coincident comment (step S17; Yes), the distribution server 500 sets a chapter to divide the live video (step S21). That is, the controller 540 (setter 541) sets a chapter to divide the live video, based on a relative time in the live video (in other words, a relative time based on the start time of the live video) corresponding to a time at which the coincident comment is received. For example, the controller 540 sets a chapter by generating the chapter management information 531 as illustrated in the afore-described FIG. 12 and adding the generated chapter management information 531 to the summary information of the live video.

The distribution server 500 determines whether or not the distribution of the live video is finished (step S19).

When the distribution server 500 determines that the distribution of the live video has not been finished (step S19; No), the distribution server 500 returns the process to the above-described step S12. In contrast, when the distribution server 500 determines that the distribution of the live video is finished (step S19; Yes), the distribution server 500 terminates the distribution processing.

The distribution processing as described above enables a comment to which the streamer reacted to be identified and a chapter to divide the live video to be easily set, based on a relative time in the live video corresponding to a reception time of the identified comment. In other words, since not a time at which the streamer reacted but a time at which a comment to which the streamer reacted was received is used, a chapter is set at a position that allows a topic having been talked about before the streamer reacted to the comment to be understood. As a result, it is possible to appropriately set a chapter to divide a live video. In addition, although, conventionally, chapter setting has been a heavy burden because a streamer or a viewer manually set a chapter, it is possible to eliminate such a human burden because the present embodiment enables a chapter to be automatically set.

Although, in the above-described Embodiment 2, a case where, based on generated chapter management information, chapter information CD is added to the summary area SA as illustrated in FIG. 13 was described, it may be configured such that a message including such chapter information CD can be posted to a social networking service (SNS). A user who, after a message including chapter information CD has been posted to an SNS, has viewed the message performing operation on the chapter information CD causes, for example, a video viewing app to be started and enables the live video to be viewed from the start position of the chapter in the same manner as described above.

Other Embodiments

Although, in the above-described Embodiments 1 and 2, a case where, by comparing a speech text, which is generated by subjecting speech spoken by a streamer in a live video to speech recognition, with respective comments currently being displayed, a comment to which the streamer reacted is identified was described, a comment to which a streamer reacted may be identified using other methods. For example, the streamer terminal 200 may be configured to allow the streamer to arbitrarily select a posted comment, and a comment selected by the streamer may be identified as a comment to which the streamer reacted.

When described in more detail, the display 270 of the streamer terminal 200, as with the display 350 of the viewer terminal 300, has a comment area and displays a comment (posted comment) received by the sender/receiver 230 in the comment area. When the streamer who is distributing the live video selects one of comments displayed in the comment area, the controller 260 sends selection information indicating a selected comment to the distribution server 100 or 500 through the sender/receiver 230. In the distribution server 100 or 500 that has received the selection information, the identifier 144, based on the selection information, identifies a comment to which the streamer reacted. In this case, it is possible to identify a comment to which the streamer reacted without error.

Although, in the above-described Embodiments 1 and 2, cases where the speech recognizer 143, the identifier 144, and the like are included in the controllers 140 and 540 of the distribution servers 100 and 500 and the distribution servers 100 and 500 identify a comment (comment to which the streamer reacted) were described, respectively, the configurations of the speech recognizer 143, the identifier 144, and the like may be added to the controller 260 of the streamer terminal 200 and the streamer terminal 200 may thereby identify a comment.

In the above-described Embodiments 1 and 2, programs that are executed by the distribution servers 100 and 500 and the like can be stored in a computer-readable recording medium, such as a compact disc read only memory (CD-ROM), a DVD, a magneto-optical disk (MO), a USB memory, and a memory card, and distributed. By installing such programs in a specific or general-purpose computer, it is possible to cause the computer to function as the distribution servers 100 and 500 in the above-described Embodiments 1 and 2, respectively.

In addition, it may be configured such that the above-described programs are stored in a disk device that a server device on a communication network, such as the Internet, has and are, for example, superimposed on a carrier wave and downloaded to a computer. In addition, by starting and executing programs while transferring the programs via a communication network, the above-described processing can be achieved. Further, by causing a server device to execute all or some of programs and a computer to execute a program while sending and receiving information relating to the processing in the server device via a communication network, the above-described processing can also be achieved.

Note that, when the above-described functions are achieved by the operating system (OS) sharing some of the functions, are achieved by collaboration between the OS and applications, or the like, only programs other than the OS may be stored in the above-described recording medium and distributed or may be downloaded to a computer.

[1] A server device including
one or more processors,
wherein at least one of the one or more processors executes processing of:
distributing a live video provided from a streamer to a plurality of terminals each of which has a comment area, the comment area allowing a predetermined number of comments to be displayed;
receiving a comment posted from, among the plurality of terminals, a viewer terminal used by a viewer during distribution of the live video;
sending the received comment to the plurality of terminals to cause the comment to be added to the comment areas in a last-in-first-out manner;
identifying, among respective comments currently being displayed in the comment area, a comment to which the streamer reacted; and
setting a chapter to divide the live video, based on a relative time in the live video corresponding to a time at which the identified comment is received.

[2] The server device according to [1], wherein, in the identification of a comment, the server device identifies, among respective comments currently being displayed in the comment area of, among the plurality of terminals, a streamer terminal used by the streamer, a comment selected by the streamer as a comment to which the streamer reacted.

[3] The server device according to [1], wherein, in the identification of a comment, the server device identifies a comment to which the streamer reacted in the live video being distributed by, every time the streamer speaks, comparing a speech text, the speech text being acquired by subjecting speech of the streamer to speech recognition, with respective comments currently being displayed in the comment area.

[4] The server device according to [3], wherein, in the identification of a comment, the server device compares a keyword included in the speech text with a keyword included in each of the comments and identifies a comment including a keyword coinciding with the keyword in the speech text as a comment to which the streamer reacted.

[5] A setting method including a computer:
distributing a live video provided from a streamer to a plurality of terminals each of which has a comment area, the comment area allowing a predetermined number of comments to be displayed;
receiving a comment posted from, among the plurality of terminals, a viewer terminal used by a viewer during distribution of the live video;
sending the received comment to the plurality of terminals to cause the comment to be added to the comment areas in a last-in-first-out manner;
identifying, among respective comments currently being displayed in the comment area, a comment to which the streamer reacted; and
setting a chapter to divide the live video, based on a relative time in the live video corresponding to a time at which the identified comment is received.

[6] A non-transitory computer-readable recording medium storing a program, the program causing a computer to execute processing of:
distributing a live video provided from a streamer to a plurality of terminals each of which has a comment area, the comment area allowing a predetermined number of comments to be displayed;

receiving a comment posted from, among the plurality of terminals, a viewer terminal used by a viewer during distribution of the live video;

sending the received comment to the plurality of terminals to cause the comment to be added to the comment areas in a last-in-first-out manner;

identifying, among respective comments currently being displayed in the comment area, a comment to which the streamer reacted; and setting a chapter to divide the live video, based on a relative time in the live video corresponding to a time at which the identified comment is received.

INDUSTRIAL APPLICABILITY

The present disclosure is suitably applicable to video distribution in which a chapter is set based on reaction of a streamer during distribution.

Reference Signs List

| | |
|---|---|
| 1, 2 | Distribution system |
| 100, 500 | Distribution server |
| 110 | Sender |
| 120 | Receiver |
| 130, 530 | Storage |
| 131 | Comment management information |
| 531 | Chapter management information |
| 140, 540 | Controller |
| 141 | Distribution controller |
| 142 | Comment manager |
| 143 | Speech recognizer |
| 144 | Identifier |
| 145 | Display controller |
| 541 | Setter |
| 200 | Streamer terminal |
| 210 | Image capturer |
| 220 | Voice input device |
| 230 | Sender/receiver |
| 240 | Operation acceptor |
| 250 | Storage |
| 260 | Controller |
| 261 | Synthesizer |
| 262 | Distributor |
| 270 | Display |
| 300 | Viewer terminal |
| 310 | Sender/receiver |
| 320 | Operation acceptor |
| 330 | Storage |
| 340 | Controller |
| 350 | Display |
| 400 | Information processing device |
| 401 | CPU |
| 402 | ROM |
| 403 | RAM |
| 404 | NIC |
| 405 | Image processor |
| 406 | Sound processor |
| 407 | Auxiliary storage |
| 408 | Interface |
| 409 | Image capturing unit |
| 410 | Voice unit |
| 411 | Operation unit |
| 412 | Display unit |
| 900 | Internet |

The invention claimed is:

1. A server device comprising
one or more processors,
wherein at least one of the one or more processors executes processing of:

distributing a live video provided from a streamer to a plurality of terminals each of which has a comment area, the comment area allowing a predetermined number of comments to be displayed;

receiving a comment posted from, among the plurality of terminals, a viewer terminal used by a viewer during distribution of the live video;

sending the received comment to the plurality of terminals to cause the comment to be added to the comment areas in a last-in-first-out manner;

identifying, among respective comments currently being displayed in the comment area, a comment to which the streamer reacted; and setting a chapter to divide the live video, based on a relative time in the live video corresponding to a time at which the identified comment is received.

2. The server device according to claim 1, wherein, in the identification of a comment, the server device identifies, among respective comments currently being displayed in the comment area of, among the plurality of terminals, a streamer terminal used by the streamer, a comment selected by the streamer as a comment to which the streamer reacted.

3. The server device according to claim 1, wherein, in the identification of a comment, the server device identifies a comment to which the streamer reacted in the live video being distributed by, every time the streamer speaks, comparing a speech text, the speech text being acquired by subjecting speech of the streamer to speech recognition, with respective comments currently being displayed in the comment area.

4. The server device according to claim 3, wherein, in the identification of a comment, the server device compares a keyword included in the speech text with a keyword included in each of the comments and identifies a comment including a keyword coinciding with the keyword in the speech text as a comment to which the streamer reacted.

5. A setting method comprising
a computer:

distributing a live video provided from a streamer to a plurality of terminals each of which has a comment area, the comment area allowing a predetermined number of comments to be displayed;

receiving a comment posted from, among the plurality of terminals, a viewer terminal used by a viewer during distribution of the live video;

sending the received comment to the plurality of terminals to cause the comment to be added to the comment areas in a last-in-first-out manner;

identifying, among respective comments currently being displayed in the comment area, a comment to which the streamer reacted; and setting a chapter to divide the live video, based on a relative time in the live video corresponding to a time at which the identified comment is received.

6. A non-transitory computer-readable recording medium storing a program, the program causing a computer to execute processing of:

distributing a live video provided from a streamer to a plurality of terminals each of which has a comment area, the comment area allowing a predetermined number of comments to be displayed;

receiving a comment posted from, among the plurality of terminals, a viewer terminal used by a viewer during distribution of the live video;

sending the received comment to the plurality of terminals to cause the comment to be added to the comment areas in a last-in-first-out manner, identifying, among respective comments currently being displayed in the comment area, a comment to which the streamer reacted; and setting a chapter to divide the live video, based on a relative time in the live video corresponding to a time at which the identified comment is received.

* * * * *